(12) United States Patent
Boschker et al.

(10) Patent No.: US 9,170,111 B2
(45) Date of Patent: Oct. 27, 2015

(54) MAPPING OR NAVIGATION APPARATUS AND METHOD OF OPERATION THEREOF

(75) Inventors: Breght Boschker, Hilversum (NL); Theo Kamalski, Weert (NL)

(73) Assignee: TomTom International B.V., Amsterdam (NL)

( * ) Notice: Subject to any disclaimer, the term of this patent is extended or adjusted under 35 U.S.C. 154(b) by 98 days.

(21) Appl. No.: 13/992,283

(22) PCT Filed: Dec. 7, 2010

(86) PCT No.: PCT/EP2010/069074
§ 371 (c)(1),
(2), (4) Date: Jun. 7, 2013

(87) PCT Pub. No.: WO2012/076040
PCT Pub. Date: Jun. 14, 2012

(65) Prior Publication Data
US 2013/0261954 A1 Oct. 3, 2013

(51) Int. Cl.
*G01C 21/00* (2006.01)

(52) U.S. Cl.
CPC ..................................... *G01C 21/00* (2013.01)

(58) Field of Classification Search
None
See application file for complete search history.

(56) References Cited

U.S. PATENT DOCUMENTS

| 8,260,543 | B2 * | 9/2012 | Han | 701/409 |
| 8,311,741 | B1 * | 11/2012 | Lawther et al. | 701/527 |
| 8,600,659 | B1 * | 12/2013 | Scherzinger | 701/400 |
| 2002/0169793 | A1 * | 11/2002 | Sweeney | 707/204 |
| 2008/0218523 | A1 * | 9/2008 | Zuverink | 345/473 |
| 2008/0270468 | A1 * | 10/2008 | Mao et al. | 707/104.1 |
| 2009/0319166 | A1 * | 12/2009 | Khosravy et al. | 701/200 |
| 2010/0017733 | A1 * | 1/2010 | Barros | 715/766 |
| 2010/0262836 | A1 * | 10/2010 | Peukert et al. | 713/189 |
| 2011/0099046 | A1 * | 4/2011 | Weiss et al. | 705/7.31 |
| 2011/0153208 | A1 * | 6/2011 | Kruglick | 701/209 |
| 2011/0159861 | A1 * | 6/2011 | Pratt et al. | 455/417 |
| 2012/0041672 | A1 * | 2/2012 | Curtis et al. | 701/426 |
| 2012/0046860 | A1 * | 2/2012 | Curtis et al. | 701/418 |
| 2013/0066555 | A1 * | 3/2013 | Menzel et al. | 701/537 |
| 2013/0261954 | A1 * | 10/2013 | Boschker et al. | 701/410 |

FOREIGN PATENT DOCUMENTS

WO 2009053405 A1 4/2009

OTHER PUBLICATIONS

Defintion of "address", "location" and "place", Merriam-Webster Dictionary website, all pages, date unknown, retrieved from http://www.merriam-webster.com/.*
"Interstate 40", Wikipedia website, all pages, date unknown, retrieved from http://www.wikipedia.com.*

(Continued)

*Primary Examiner* — Calvin Cheung

(57) ABSTRACT

A mapping or navigation device comprises or is connectable to position determining apparatus, the position determining apparatus being operable to determine one or more locations of the mapping or navigation device, the one or more determined locations forming at least one route, wherein the mapping or navigation device is configured to determine at least one portion of the at least one route, where the at least one portion is determined according to at least one property associated with at least one location comprised in the portion, and the mapping or navigation device is configured to form at least one anonymized route from the at least one determined route, wherein the at least one anonymized route does not include the at least one portion of the at least one route.

19 Claims, 8 Drawing Sheets

(56) References Cited

OTHER PUBLICATIONS

International Search Report issued Sep. 7, 2011 for International Application No. PCT/EP2010/069074.
Baik Hoh, Marco Gruteser: "Protecting Location Privacy Through Path Confusion", Security and Privacy for Emerging Areas in Communications Networks, 2005, Securecomm 2005, First International Conference on, Sep. 5, 2005, pp. 194-205, XPOOOO02657503.
Baik Hoh, Marco Gruteser, Hui Xiong, Ansaf Alrabady: "Preserving privacy in gps traces via uncertainty-aware path cloaking". CCS'07 Proceedings of the 14th ACM Conference on Computer Communications Security, Dec. 31, 2007, pp. 161-171, XP000002657504.

* cited by examiner

MAPPING OR NAVIGATION APPARATUS AND METHOD OF OPERATION THEREOF

CROSS-REFERENCES TO RELATED APPLICATIONS

This application is the National Stage of International Application No. PCT/EP2010/069074 filed Dec. 7, 2010 and designating the United States. The entire content of this application is incorporated herein by reference.

FIELD OF THE INVENTION

The present invention relates to a mapping or navigation apparatus of the type that, for example, determines a route from a location to another location and optionally can communicate route information with a remote system. The present invention also relates to a method of operating a mapping or navigation apparatus, optionally in respect of its communication with a remote system.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch, for example by using soft keys.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 920T model manufactured and supplied by TomTom International B.V., provide a reliable means for enabling users to navigate from one position to another. Such devices are of great utility when the user is not familiar with the route to the destination to which they are navigating.

As mentioned above, the memory of the PND stores map data and other data such as road information and historical information about road speeds which may be used by the PND to calculate routes and provide necessary navigation instructions to users.

Although route specific information such as the maximum legal speed for a road may be used to calculate the expected vehicle speed for a section of road, in practice, factors such as congestion or road features such as a series of sharp bends may alter the actual speed achievable on particular sections of roads and/or at particular times. Physical traffic flow monitoring systems may be in place on some roads in order to determine the average speed of traffic. However, such systems are expensive to install and coverage may not be widespread.

Another option for collecting more accurate mapping and route planning data is by utilising trace data stored in individual navigation devices. Trace data represents a route or journey and typically comprises a plurality of location and time data points, which may be used to determine information such as vehicle speed. Such trace data may optionally be stripped of some personal identifying data, such as user name or device identifier, and transmitted to a central server whereupon it may be aggregated with similar data provided by other navigation devices to provide aggregated or average actual "real life" journey data for particular locations and times. As such data can be averaged over a great many users and for extended periods of time, it may provide a much more accurate and representative representation of journey data such as typical speeds. In addition, it may be used to provide improved mapping and navigation logic by comparing actual routes with predicted or expected routes.

However, issues of personal privacy are often of great importance to users and therefore providers of such navigation devices. In this regard, even when personal identifying data such as user name or device identifier has been removed from the data provided by a navigation device, it may still be possible to trace the trace data back to particular users, for example by cross referencing it with other data sources. For example, journeys taken by users often start and/or finish in locations associated with the user, such as the user's home, the user's work place or the user's friends or family. In this case, the start and finish locations of the routes stored in the trace data may be compared with address listings in order to determine address listings at or around the start and finish points and thereby the people who live there which may, in some cases, allow the user of the device to be identified from the route trace. It will be appreciated that statistical methods may be used to enhance this process.

However, the data at locations such as start or end points may be particularly useful, for example, for determining the location and/or availability of parking spaces.

At least one object of at least one embodiment of the present invention is to overcome or mitigate at least one problem in the prior art. At least one object of at least one embodiment of the present invention is to provide improved privacy to users of portable navigation and/or mapping devices and/or increase the amount of data that may be extracted from such devices whilst maintaining privacy. At least one object of at least one embodiment of the present invention is to improve the usefulness of location data that may be obtained from navigation or mapping devices or the amount of useful data that may be stored by such devices.

SUMMARY OF THE INVENTION

According to a first aspect of the present invention, there is provided a mapping or navigation device comprising or connectable to position determining apparatus, the position determining apparatus being operable to determine one or more locations of the mapping or navigation device, the one or more determined locations forming at least one route; wherein
- the mapping or navigation device is configured to determine at least one portion of the at least one route, where the at least one portion is determined according to at least one property associated with at least one location comprised in the portion; and
- the mapping or navigation device is configured to form at least one anonymized route from the at least one determined route, wherein the at least one anonymized route does not include the at least one portion of the at least one route.

The at least one location with which the at least one property is associated may be an identity sensitive location. The identity sensitive location may comprise a location associated with a user of the mapping or navigation device and/or a location which may be indicative of the user and/or a location from which the user may be identified.

The mapping or navigation device may configured to determine the at least one portion of the at least one route dynamically. The size and/or shape of the portion may vary from route to route.

The portion of the route may be an identity sensitive portion associated with an identity sensitive location. The portion of the route may be a portion of the route before and/or after an identity sensitive location.

The mapping or navigation device may be configured to ascertain if a determined location belonging to the at least one route is associated with an identity sensitive location and to determine one or more identity sensitive portions of the one or more routes associated with at least one of the identity sensitive locations.

The route may comprise and/or be represented by a route trace.

At least one anonymized route may comprise a subset or a superset of a corresponding route. At least one anonymized route may be an abbreviated route, which may be a route without one or more identity sensitive portions of the route.

The position determining apparatus may comprise a GPS apparatus and/or a triangulation device, such as a microwave or radio frequency triangulation device.

The mapping or navigation device may comprise a data store, such as a memory or mass storage device, for storing the one or more determined locations.

The mapping or navigation device may comprise communications apparatus, which may be communications apparatus for communicating with an external or remote device, such as a server. The communications apparatus may comprise one or more physical connector interfaces by means of which power and optionally data signals can be transmitted to and received from the device, and optionally one or more wireless transmitters/receivers to allow communication over cellular telecommunications and other signal and data networks, for example, Bluetooth, Wi-Fi, Wi-Max, GSM, UMTS and the like.

The mapping or navigation device may be adapted to communicate at least some of the determined locations belonging to the at least one route using the communications apparatus.

Advantageously, the mapping or navigations device may be configured to communicate the anonymized routes using the communications apparatus.

The mapping or navigation apparatus may be configured to form the at least one anonymized route by modifying and/or deleting and/or removing and/or selectively not storing and/or selectively not communicating at least one identity sensitive portion of a corresponding route. The modifying of the at least one identity sensitive portion may comprise adding one or more locations to the identity sensitive portion.

In an alternative or additional embodiment, the mapping or navigation apparatus may be configured to form the at least one anonymized route by modifying at least one identity sensitive portion of the route, which may comprise reducing the accuracy of at least one location and preferably each location within the identity sensitive portion. The modifying may comprise displacing at least one and preferably each location of at least one identity sensitive portion of the route, which may be by a random amount or according to a set of predetermined criteria. For example, if a location is in on a residential street, such as at the end of a residential street, then the locations may be displaced to a middle of a street or a middle of a housing estate or other predefined area. In this way, it may be harder to determine the location of identity sensitive locations from the anonymized trace data. The modified portion of the route may be tagged so that it can be identified later, such that it may be identified as modified when processing the data, so as to not affect the accuracy of any data extracted therefrom. The anonymized route may comprise the modified location data derived from at least one identity sensitive location.

In an alternative or additional embodiment, the mapping or navigation apparatus may be configured to determine a plurality of anonymized routes from individual determined routes, at least one of the plurality of routes comprising at least one first identity sensitive portion but not at least one second identity sensitive portion and at least one other of the plurality of routes comprising one second identity sensitive portion but not at least one first identity sensitive portion. This may comprise dividing the determined route into at least two sections, each section comprising a different identity sensitive portion, and each section forming a different anonymized route. The at least two sections, when combined, may comprise the determined route. The mapping or navigation apparatus may be configured to separately store and/or communicate each of the sections. For example, the route may be divided into a start section associated with the start of the route and an end section associated with an end of the route. In this way, a third party looking at the anonymized traces wont know which anonymized trace contains a start of the journey or an end of a journey. It will be appreciated that the route may optionally be divided into more than two sections, for example, a section comprising the start of a route, a section comprising the end of a route and one or more sections comprising one or more intermediate or via points or other identity sensitive locations. In this way, the privacy of the user may be increased further.

The identity sensitive locations may comprise locations and/or part of a route that corresponds to a start of the route and/or an end of the route and/or a location specified by the user, such as a via or intermediate journey point.

The identity sensitive locations may comprise locations and/or part of a route that corresponds to a location associated with a user of the navigation and/or mapping apparatus, such as a home address, a work address and/or addresses stored in a user address book or favourites list or the like. The navigation and/or navigation device may be operable to store at least one location associated with the user in the memory and/or access at least one location associated with the user via the communications apparatus, for example from a server. The navigation and/or mapping apparatus may comprise a user input device and may be configured to receive locations associated with the user via the user input device.

The identity sensitive location may comprise a location associated with means for identifying a user, such as a CCTV camera. The locations associated with means for identifying a user may be stored in the memory of the mapping or navigation device and/or may be retrievable by the mapping or navigation device using the communications apparatus, for example from a server.

The one or more determined locations may comprise associated time and/or date data representing the time and/or date the navigation device was at the determined location.

The one or more determined locations may comprise a direction and/or distance from a reference location.

The identity sensitive portion of at least one route may comprise locations of the route that are within a threshold distance and/or time period and/or number of location position data points of an identity sensitive location and/or a determined location associated with an identity sensitive location.

A size or one or more dimensions of at least one identity sensitive portion may be dynamically determined or variable. The threshold may be dynamically determined or variable.

The determination or variation of the identity sensitive portion may be dependent on map data associated with the identity sensitive location. The map data may be stored in the memory of the mapping or navigation device and/or be accessible by the mapping and navigation device, for example, from a server via the communications apparatus.

The map data may comprise density of a type or class of feature such as roads, and/or buildings and/or postal addresses, and the like. The identity sensitive portion may be larger for at least one first feature density than for at least one second feature density, wherein the first feature density is lower than the second feature density. The size of the identity sensitive portion may be inversely proportional to the feature density. Identity sensitive locations having a high density of features such as roads or buildings may be indicative of heavily populated inner city areas wherein there are much more possible addresses and therefore it may be harder to associate the collected location data to any identifiable user. In this case, the associated identity sensitive portion may be made smaller, thereby reducing the amount of data excluded from the anonymized route and maximising the usable data collected, whilst maintaining privacy of the user. Conversely, identity sensitive locations having a low feature density may be indicative of sparsely populated areas, where potential addresses may be widely separated. In such cases, the size of the associated identity sensitive portion may be increased, thereby increasing the amount of location data removed from the route around the identity sensitive location. This may increase the number of potential or possible addresses or locations covered by the identity sensitive portion, which may make it harder to identify an identity sensitive location associated with a user from the anonymized route data.

The map data may comprise feature attributes or classifications. For example, if an identity sensitive location is associated with an feature attribute or classification indicative of a communal location or a building or location type normally associated with a large number of people, such as a high rise residential or office block or a civic amenity location such as a sports stadium, theatre, shopping mall, or the like, then the size of the associated identity sensitive portion may be reduced, potentially or optionally reduced to zero, i.e. the identity sensitive portion/location is disregarded, thereby reducing the amount of determined location data of the route that is comprised within the identity sensitive portion. This increases the amount of usable data that is collectable, whilst maintaining the privacy of the user, as it would be much harder to identify any particular user from amongst the large number of potential users who could be associated with such a public or highly populated area, building or location.

The map data may comprise point of interest information and/or category and/or use data associated with the identity sensitive location. For example, if the identity sensitive location is associated with a certain point of interest tag that may be indicative of public or heavily populated areas, such as a public car park, shopping mall, tourist attraction, theatre, etc., the size of the identity sensitive portion may be reduced, as it may be hard to determine an individual user identity associated with the identity sensitive location from amongst a large number of potential users who may be present at such a point of interest.

The determination or variation of the identity sensitive portion may be dependent on location data associated with the identity sensitive location that is already stored by the mapping or navigation device and/or any server to which it is connected or connectable, for example, the amount and/or quality and/or type of data stored by the server and/or navigation or mapping device. The quality of the data may relate to an accuracy and/or definition of the data, which may be characterised relative to one or more predetermined thresholds. For example, if a large amount of location data and/or a large variety of location data and/or a number of types of location data and/or low quality location data is stored in relation to a location, the size of the associated identity sensitive portion may be decreased as there may be less chance of the location data being identifiable in the large amount of other location data associated with that particular identity sensitive location. Conversely, for identity sensitive locations for which high quality data is available or the previously obtained data is low in volume, any new location data may be easier to identify. In such areas, the size of the associated identity sensitive portion may be increased in order to increase the amount of the route within the identity sensitive portion associated with that identity sensitive location, i.e. an increased amount of location data that may potentially be an identity sensitive location from which a user can be identified is removed from the trace. In this way, the user privacy may be increased.

The determination or variation of the identity sensitive portion may be dependent on user data, which may be stored on or accessible by the navigation and/or mapping device. The user data may comprise locations associated with and/or provided by and/or selected by the user. The user data may be stored in the memory of the device and/or may be retrieved from the server via the communications apparatus and/or input by the user. Examples of suitable user data include a favourites list and/or recently visited locations and/or frequently visited locations and/or home or work locations. The mapping or navigation apparatus may have access to the user's address book or other similar information and the locations contained therein may be comprised in the user data. The favourites list or address book may include, for example, the user's home address or addresses associated with the user's friends, family or others who may be linked to the user or who may be used to identify the user. In this case, the threshold may be increased if the identity sensitive location corresponds to a location comprised within the user data. By increasing the threshold of the identity sensitive portion of the route associated with such identity sensitive locations contained in user data, a larger amount of the trace data around the identity sensitive location is removed from the anonymized route, such that it may be harder to identify the identity sensitive location from the anonymized route, which may thereby increase the privacy of the user, particularly if the identity sensitive location corresponds to a start point, end point or destination or a via or intermediate point of the route.

Optionally, the mapping or navigation device may be configured to determine a quantity of location data stored on the mapping or navigation device or an associated server and increase the threshold if a location is already well covered, i.e. a large amount of location data is already stored for that location, or decreased if the associated location has low coverage. This may allow for useful location data collection on devices that are low on memory as only useful data is stored and thereby the memory is used more efficiently.

It will be appreciated that the above device addresses potential privacy concerns, as a portion of the data covering identity sensitive locations, such as the start and/or end of each route, may be removed or modified before being transmitted from the navigation device to the server and/or before being stored on the server, thereby decreasing the door-to-door traceability of the user based on the anonymized route. At the same time, since the identity sensitive portions of the route (i.e. the portions of a route that are removed or modified) are determined based on a set of predefined parameters associated with each particular identity sensitive location, such as feature density, associated points of interest, feature type, user data and the like, the amount of location data collected may be maximised, as the identity sensitive portions may be reduced or minimized for locations that may be harder to associate with an individual user, whilst at the same time increasing privacy, by increasing or maximising the identity sensitive portions associated with identity sensitive locations that may indicated locations that are easier to link to the user. Information from or near start and end points may be particularly useful, for example, in getting data on parking spaces, and the device of the present invention may be operable to collect such data where appropriate whilst protecting user privacy.

According to a second aspect of the invention is a processing device comprising a processor coupled to communications apparatus, the processing device being configured to receive location data via the communications apparatus, the location data comprising one or more locations of the mapping or navigation device, the one or more locations forming at least one route; wherein
the processing device is operable to determine at least one portion of the at least one route, where the at least one portion is determined according to at least one property associated with at least one location comprised in the at least one portion; and form an at least one anonymized route from the at least one determined route, wherein the at least one anonymized route does not include the at least one portion of the at least one route.

The processing device may be configured to receive location data from a mapping or navigation or location determination device.

The processing device may further comprise memory or a data store. The processing device may be configured to store the at least one anonymizing route in the memory or data store.

The processing device may comprise or be comprised in a server.

The processing device may comprise or be comprised in an intermediate device, configured to receive location data from a mapping or navigation apparatus via the communication apparatus and send at least one anonymized route to an external system, such as a server, via the communication apparatus.

According to a third aspect of the present invention is a method of processing a route, comprising receiving or determining one or more locations, the one or more determined locations forming at least one route;
determining at least one portion of the route, where the at least one portion is determined according to at least one property associated with at least one location comprised in the portion; and
forming an anonymized route from the determined route, wherein the anonymized route does not include the at least one portion of the at least one route.

The method may comprise a method of operation of a mapping or communications device. The method may comprise a method of operating a mapping or communications device according to the first aspect.

According to a fourth aspect of the present invention, there is provided a mapping or navigation device comprising or connectable to position determining apparatus, the position determining apparatus being operable to determine one or more locations of the mapping or navigation device, the one or more determined locations forming at least one route; wherein
the mapping or navigation device is configured to determine at least one portion of the at least one route and to modify at least one location comprised within the at least one portion to form a modified portion of the route; and
the mapping or navigation device is configured to form at least one anonymized route from the at least one determined route, wherein the at least one anonymized route comprises the modified portion in place of the at least one portion of the at least one route.

The at least one portion of the route may comprise an identity sensitive portion which may be associated with an identity sensitive location.

The mapping or navigation apparatus may be configured to modify at least one identity sensitive portion of the route by reducing the accuracy of at least one location and preferably each location within the identity sensitive portion. The modifying may comprise displacing at least one and preferably each location of and/or a time associated with at least one identity sensitive portion of the route, which may be by a random amount or according to a set of predetermined criteria. For example, if a location is in on a residential street, such as at the end of a residential street, then the locations may be displaced to a middle of a street or a middle of a housing estate or other predefined area. In this way, it may be harder to determine the location of identity sensitive locations from the anonymized trace data. The modified portion of the route may be tagged so that it can be identified later, such that it may be identified as modified when processing the data, so as to not affect the accuracy of any data extracted therefrom.

The mapping or navigation device may comprise a mapping or navigation device according to the first aspect and/or comprise any feature described in relation to the first aspect.

According to a fifth aspect of the invention is a processing device configured to receive one or more locations, the one or more determined locations forming at least one route; wherein
the processing device is configured to determine at least one portion of the at least one route and to modify at least one location comprised within the at least one portion to form a modified portion of the route; and the processing device is configured to form at least one anonymized route from the at least one determined route, wherein the at least one anonymized route comprises the modified portion in place of the at least one portion of the at least one route.

The processing device may be configured to receive location data from a mapping or navigation or location determination device.

The processing device may further comprise memory or a data store. The processing device may be configured to store the at least one anonymizing route in the memory or data store.

The processing device may comprise or be comprised in a server.

The processing device may comprise or be comprised in an intermediate device, configured to receive location data from a mapping or navigation apparatus via the communication apparatus and send at least one anonymized route to an external system, such as a server, via the communication apparatus.

The processing device may comprise the processing device of the second aspect.

According to a sixth aspect of the present invention is a method of processing a route, comprising receiving or determining one or more locations, the one or more determined locations forming at least one route;

determining at least one portion of the at least one route and modifying at least one location comprised within the at least one portion to form a modified portion of the route; and forming at least one anonymized route from the at least one determined route, wherein the at least one anonymized route comprises the modified portion in place of the at least one portion of the at least one route.

According to a seventh aspect of the present invention is a mapping or navigation device comprising or connectable to position determining apparatus, the position determining apparatus being operable to determine one or more locations of the mapping or navigation device, the one or more determined locations forming at least one route; wherein the mapping or navigation device is configured to split the at least one route into at least two sections in order to form at least two anonymized routes.

The mapping or navigation device may be configured to determine at least one identity sensitive location. At least one and preferably each section of the anonymized route may comprise a at least one different identity sensitive location to at least one and preferably each other section. The sections of the route may be dynamically determined.

The at least two sections, when combined, may comprise the determined route. The mapping or navigation apparatus may be configured to separately store and/or communicate each of the sections. For example, the route may be divided into a start section associated with the start of the route and an end section associated with an end of the route. In this way, a third party looking at the anonymized traces wont know which anonymized trace contains a start of the journey or an end of a journey. It will be appreciated that the route may optionally be divided into more than two sections, for example, a section comprising the start of a route, a section comprising the end of a route and one or more sections comprising one or more intermediate or via points or other identity sensitive locations. In this way, the privacy of the user may be increased further.

According to an eighth aspect of the invention is a processing device configured to receive and/or determine one or more locations, the one or more determined locations forming at least one route; wherein the processing device is configured to split the at least one route into at least two sections in order to form at least two anonymized routes.

The processing device may be configured to receive location data from a mapping or navigation or location determination device.

The processing device may further comprise memory or a data store. The processing device may be configured to store the at least one anonymizing route in the memory or data store.

The processing device may comprise or be comprised in a server.

The processing device may comprise or be comprised in an intermediate device, configured to receive location data from a mapping or navigation apparatus via the communication apparatus and send at least one anonymized route to an external system, such as a server, via the communication apparatus.

The processing device may comprise the processing device of the second aspect and/or the fifth aspect.

According to a ninth aspect of the present invention is a method of processing location data comprising determining or receiving one or more locations, the one or more determined locations forming at least one route; wherein the mapping or navigation device is configured to split the at least one route into at least two sections in order to form at least two anonymized routes.

The method may be a method of operating a mapping and/or navigation device, such as the mapping or navigation device of the first and/or fourth and/or seventh aspects of invention.

According to a tenth aspect of the present invention, there is provided a computer program element comprising computer program code means to make a computer execute the method as set forth above in relation to the third and/or sixth and/or ninth aspects of the invention or to implement the apparatus as set forth in any of the first, second, fifth, sixth, eighth or ninth aspects of invention.

The computer program element may be embodied on a computer readable medium.

According to an eleventh aspect of the present invention is an apparatus when programmed with the computer program element of the tenth aspect of invention.

Advantages of these embodiments are set out hereafter, and further details and features of each of these embodiments are defined in the accompanying dependent claims and elsewhere in the following detailed description.

It will be appreciates that features described in relation to any of the above aspects of invention may also optionally be generally applicable to any other aspect of invention. Furthermore, it will also be appreciated that method features analogous to any described apparatus features are intended to fall within the scope of the disclosure and vice versa.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
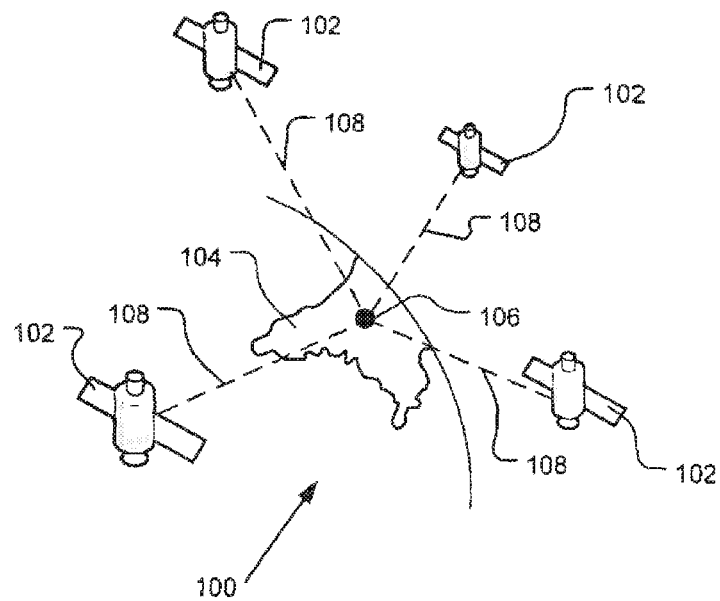
FIG. 1 is a schematic illustration of an exemplary part of a Global Positioning System (GPS) usable by a navigation device.

Throughout the following description identical reference numerals will be used to identify like parts.

Embodiments of the present invention will now be described with particular reference to a PND. It should be remembered, however, that the teachings of the present invention are not limited to PNDs but are instead universally applicable to any type of processing device that is configured to execute navigation and/or mapping software in a portable manner so as to provide route planning, location determination and/or navigation functionality. It follows therefore that in the context of the present application, a navigation device is intended to include (without limitation) any type of route planning, mapping or navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

It will also be apparent from the following that the teachings of the present invention even have utility in circumstances where a user is not seeking instructions on how to navigate from one point to another but merely wishes to be provided their location or a route taken. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
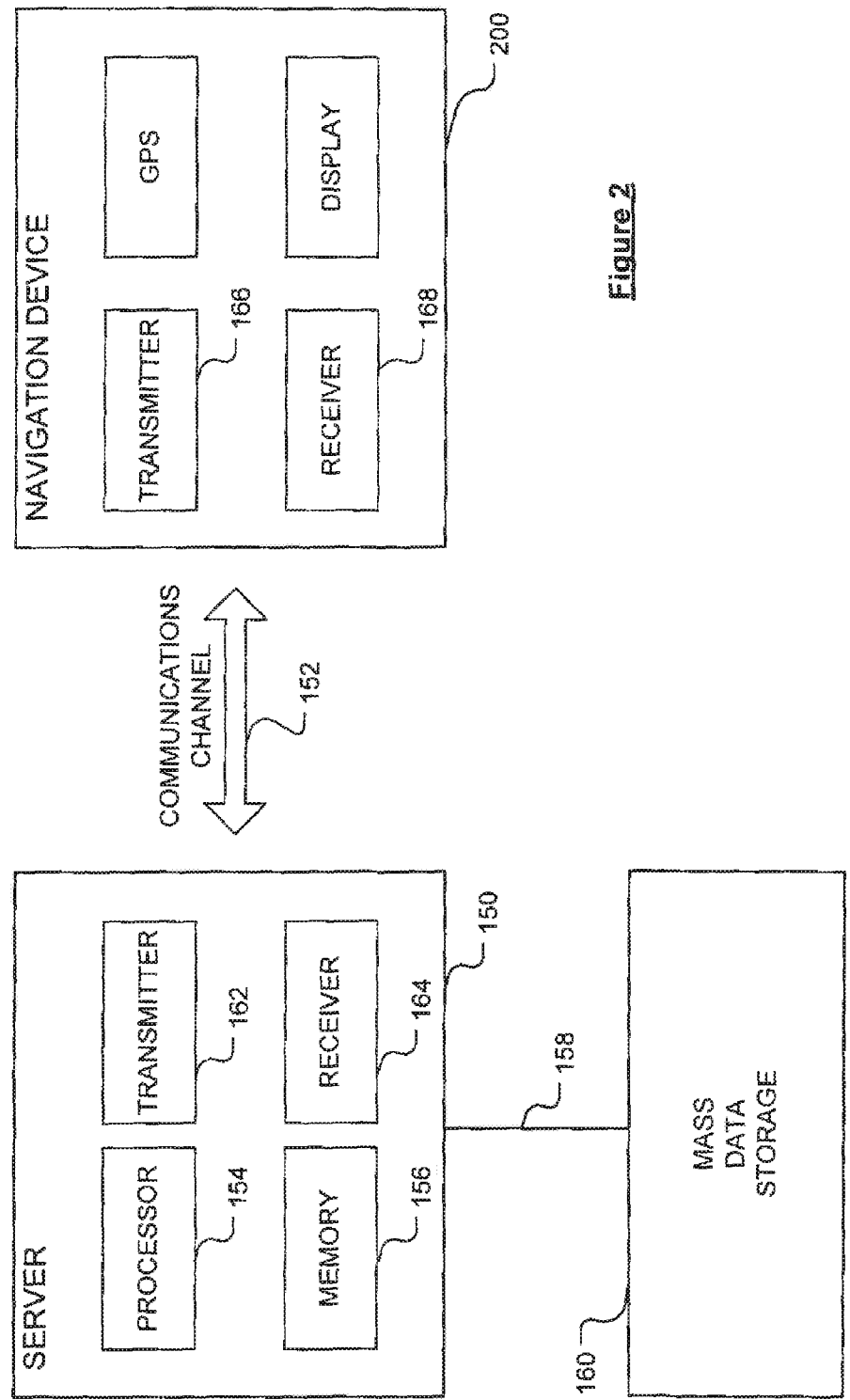
FIG. 2 is a schematic diagram of a communications system for communication between a navigation device and a server.

Turning to FIG. 2, a navigation device 200 comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11a/b/c/g/n, etc.

Hence, it can be seen that the internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

The network connection may also be provided intermittently, for example, when the navigation device is connected to a network, such as the internet, directly via a wi-fi or cabled connection or by connecting the device, which may include wireless connection, with an intermediary device such as a personal computer that has a network connection.

The network connection may not be direct, i.e. the navigation device need not be directly connected to a remote server, but instead, data may be downloaded from it into the intermediary device and thereafter, which may be at a later time or date and may be after the navigation device has been disconnected, the intermediary device may forward the data to the remote server.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an internet connection between the server 150 and the navigation device 200.

The navigation device 200 may be provided with information from the server 150 via information downloads which may be periodically updated automatically or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
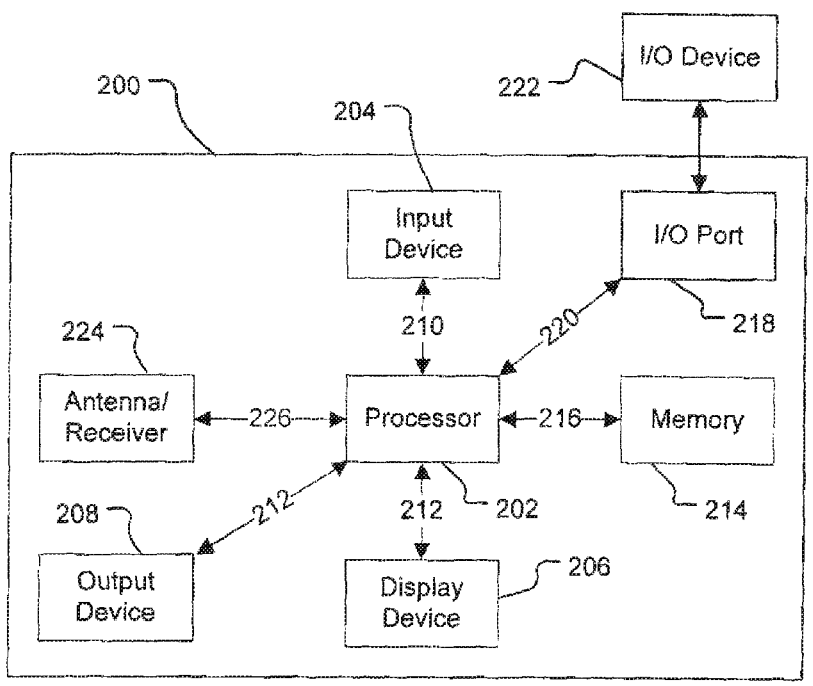
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes a processing resource comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it is should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone, personal computer, internet router or modem for example, wherein the connection can be used to establish a data connection between the navigation device 200 and the Internet or any other network for example, and/or to establish a connection to a server via the Internet or some other network for example.

FIG. 3 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use.

Figure 4:
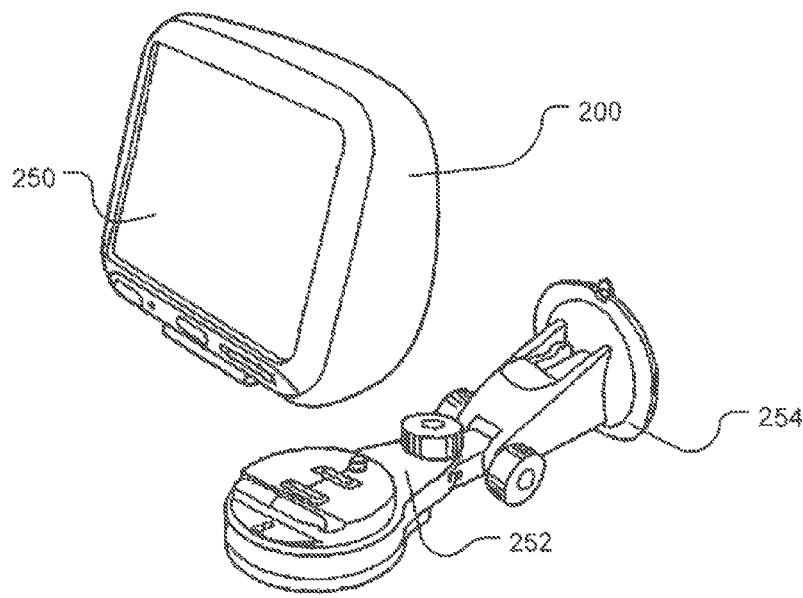
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the microprocessor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 5:
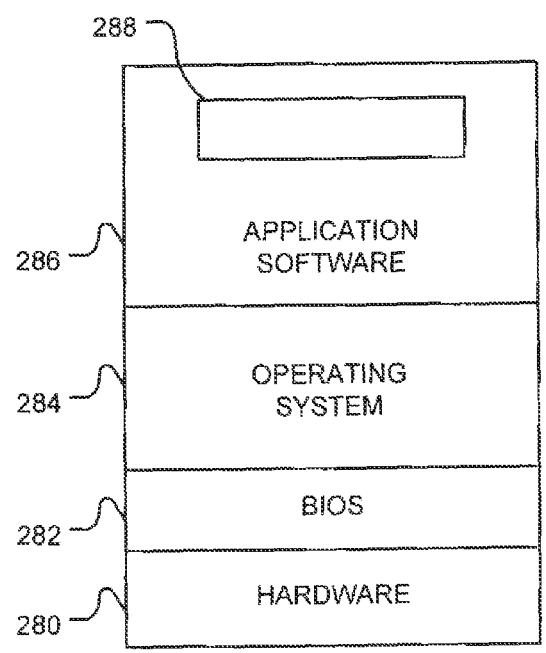
FIG. 5 is a schematic representation of an architectural stack employed by the navigation device of FIG. 3.

Turning to FIG. 5, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the above described route planning and navigation functionality 288) can run.

Referring now to FIGS. 6 to 14, an illustrative destination location input process will firstly be described in respect of a user whose start location is an airport in Lyon, France, and who wishes to navigate to a street address in Grenoble, France, for which the user knows the street name and building number. Although not shown, the user uses a settings menu option supported by the application software 286 in order to select view generation in a three-dimensional mode.

Figure 6:
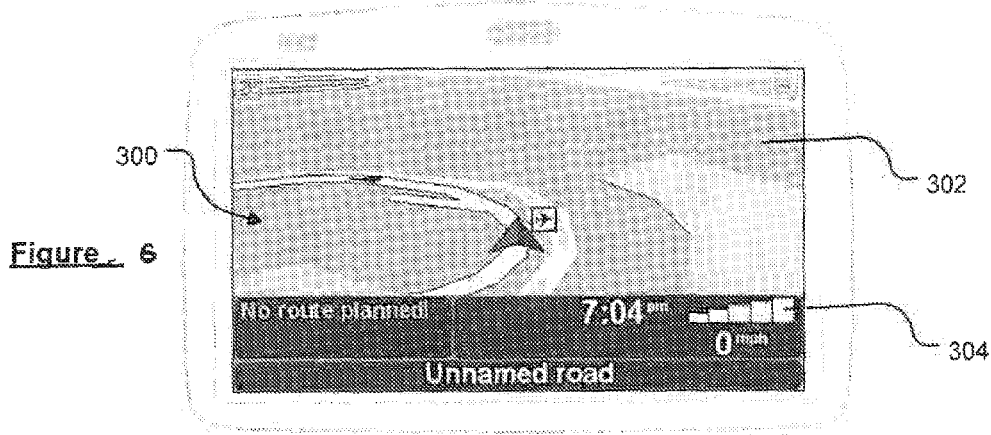
FIGS. 6 to 14 are screen shots from the navigation device of FIG. 3.

When this user switches on the navigation device 200, the device 200 acquires a GPS fix and calculates (in a known manner) the current location of the navigation device 200. The user is then presented, as shown in FIG. 6, with a display 300 showing in pseudo three-dimensions the local environment 302 in which the navigation device 200 is determined to be located, and in a region 304 of the display 300 below the local environment a series of control and status messages.

Figure 7:
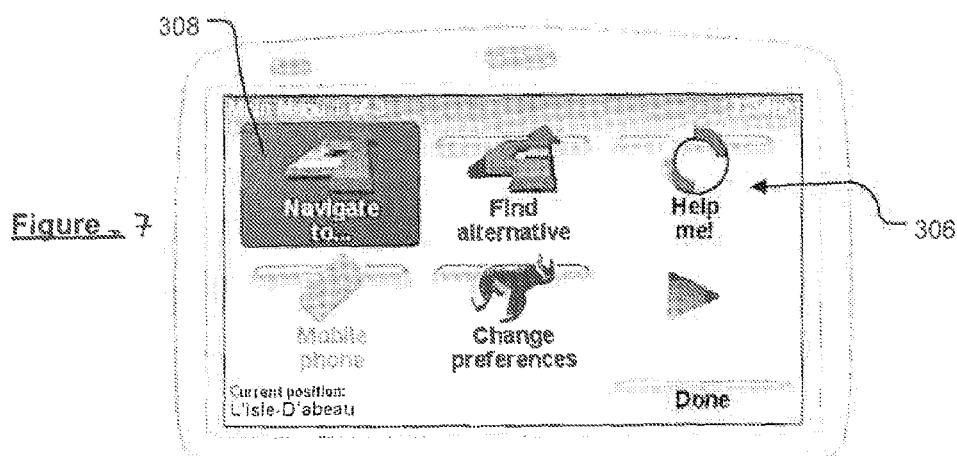

By touching the display of the local environment 302, the navigation device 200 switches to display (as shown in FIG. 7) a series of virtual or soft buttons 306 by means of which a user can, inter alia, input a destination to which they wish to navigate.

Figure 8:
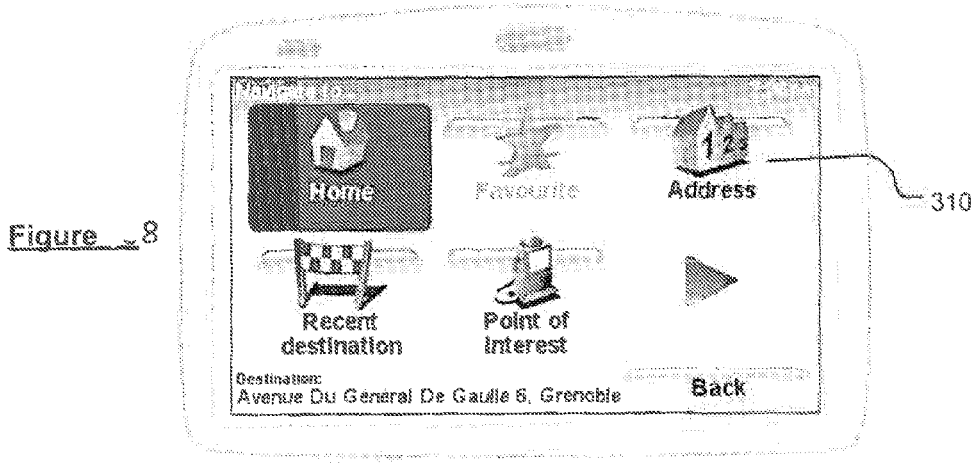

By touching the "Navigate to" virtual button 308, the navigation device 200 switches to display (as shown in FIG. 8) a plurality of virtual buttons that are each associated with a different category of selectable destinations. In this instance, the display shows a "home" button that if pressed would set the destination to a stored home location. The "favourite" button, if pressed, reveals a list of destinations that the user has previously stored in the navigation device 200 and if one of these destinations is then selected the destination for the route to be calculated is set to the selected previously stored destination. The "recent destination" soft button, if pressed, reveals a list of selectable destinations held in the memory of the navigation device 200 and to which the user has recently navigated. Selection of one of the destinations populating this list would set the destination location for this route to the selected (previously visited) location. The "point of interest" button, if pressed, reveals a number of options by means of which a user can opt to navigate to any of a plurality of locations, such as Automatic Teller Machines (ATMs), petrol stations or tourist attractions for example, that have been pre-stored in the navigation device 200 as locations to which a user of the navigation device 200 might want to navigate to. The triangular "arrow" shaped virtual button provides access to additional sub-menu options relating to the "Navigate to . . . " menu option, and an "address" button 310 commences a process by which the user can input the street address of the destination to which the user wishes to navigate.

Figure 9:
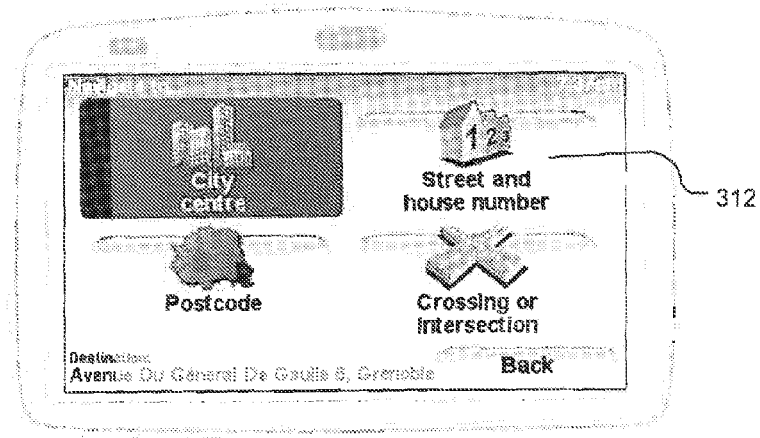

Since the user, in this example, knows the street address of the destination to which the user wishes the navigation device 200 to navigate, it is assumed that the "address" button 310 is operated (by touching the button displayed on the touchscreen), whereupon (as shown in FIG. 9) the user is presented with a series of address input options—in particular for address input by "city centre", by "postcode", by "crossing or intersection" (for example a junction of two roads) and by "street and house number".

Figure 10:
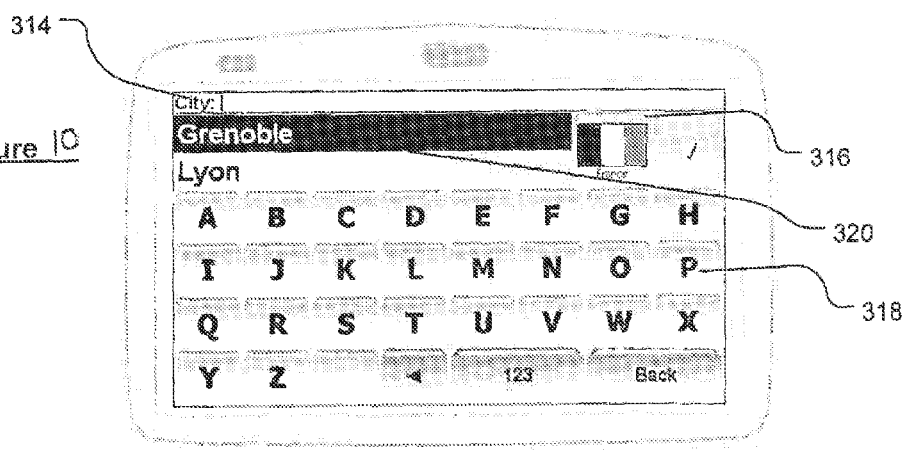

In this example, the user knows the street address and house number of the destination and hence selects the "street and house number" virtual button 312 whereupon the user is then presented, as shown in FIG. 10, a prompt 314 to enter the name of the city to which they wish to navigate, a flag button 316 by means of which the user can select the country in which the desired city is located, and a virtual keyboard 318 that may be operated by the user, if necessary, to input the name of the destination city. In this instance the user has previously navigated to locations in Lyon and Grenoble, and the navigation device 200 therefore additionally provides the user with a list 320 of selectable cites.

Figure 11:
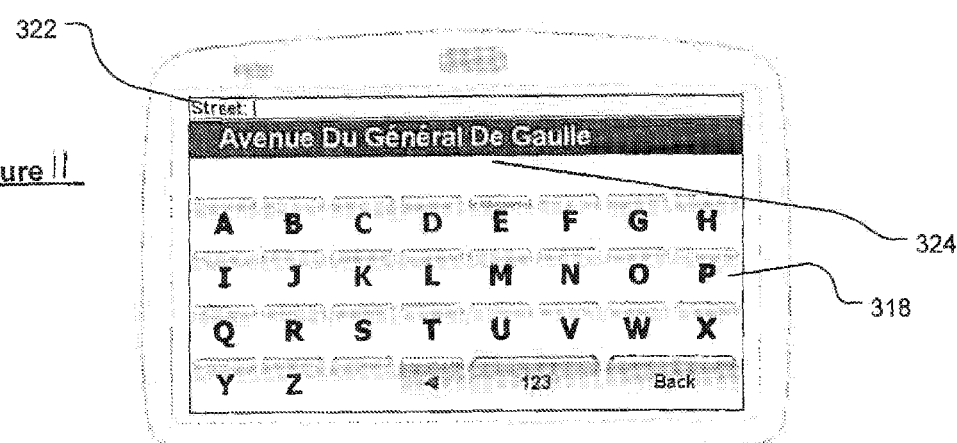

The user in this instance wishes to navigate to Grenoble, and on selection of Grenoble from the list 320 the navigation device 200 displays, as shown in FIG. 11, the virtual keyboard 318 by means of which a user can input street names, a prompt 322 for entry of a streetname and, in this instance, as the user has previously navigated to a street in Grenoble, a list 324 of selectable streets in Grenoble.

In this example, the user wishes to return to the street, Avenue Du General De Gaulle previously visited by the user, the user selects Avenue Du General De Gaulle from the displayed list 324.

Figure 12:
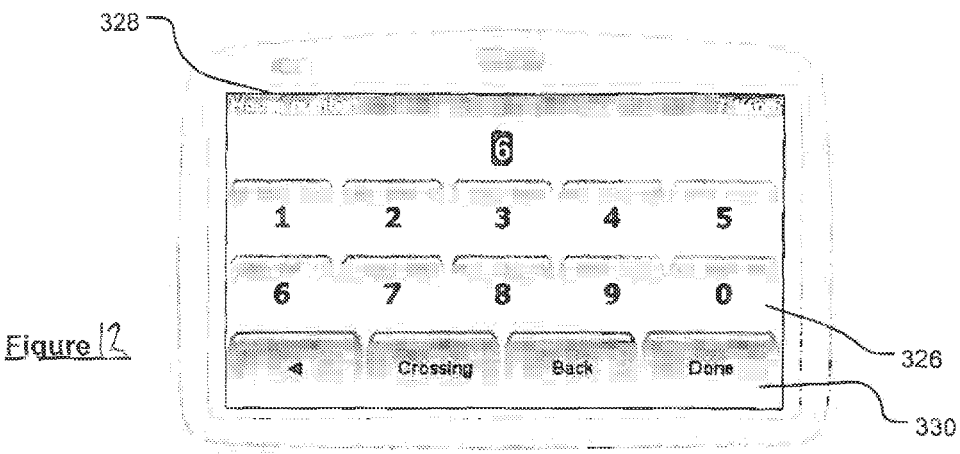

Once a street has been selected, the navigation device 200 then displays a restricted, largely numeric, virtual keypad 326 and prompts the user, by means of prompt 328, to enter the number of the house in the selected street and city to which the user wishes to navigate. If the user has previously navigated to a building number in this street, then that number (as shown in FIG. 12) is initially shown. If, as in this instance, the user wishes to navigate to No. 6, Avenue Du General De Gaulle once again, then the user need only touch a "done" virtual button 330 displayed at the bottom right hand corner of the display 300. If the user should wish to navigate to a different building number in Avenue Du General De Gaulle, then all the user need do is operate the virtual keypad 328 to input an appropriate building number.

Figure 13:
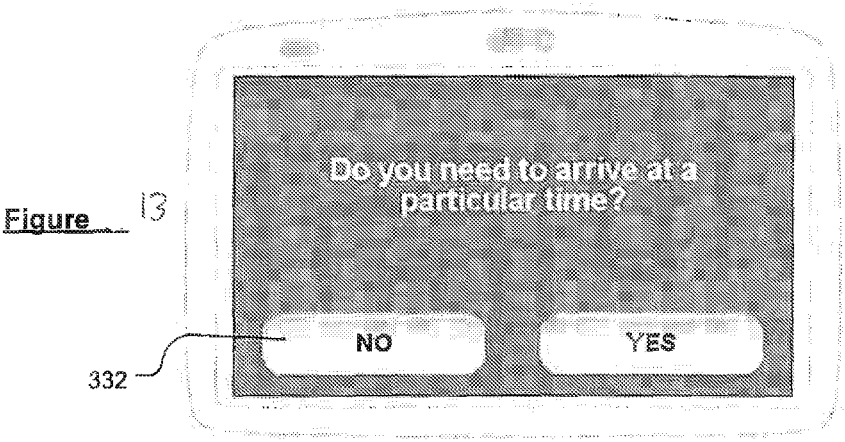

Once the building number has been input or selected, the user is asked in FIG. 13, whether a particular arrival time is required. If the user should push the "yes" button, then functionality is invoked that estimates the time required to travel to the destination and advises the user when they should leave (or if they are running late, should have left) their current location in order to arrive at their destination on time. In this instance, the user is not concerned about arriving at a particular time and hence selects the "no" virtual button.

Figure 14:
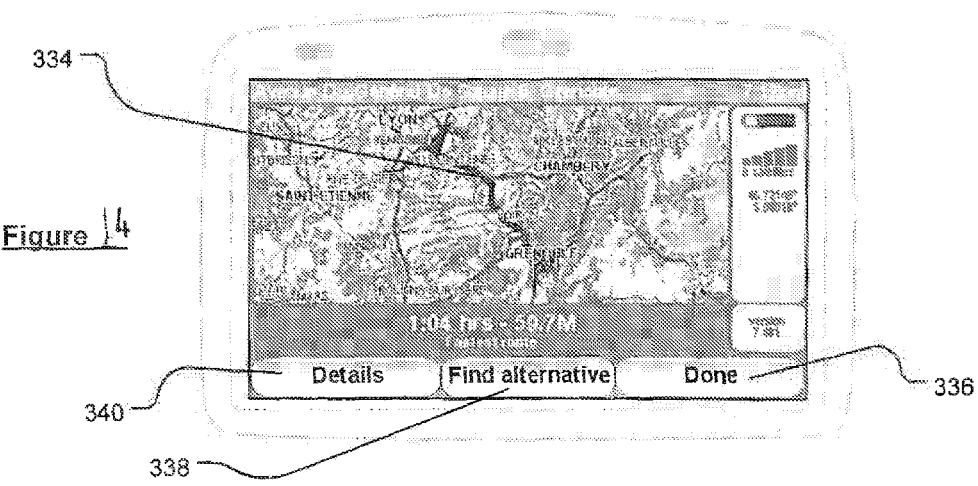
Figure 15:
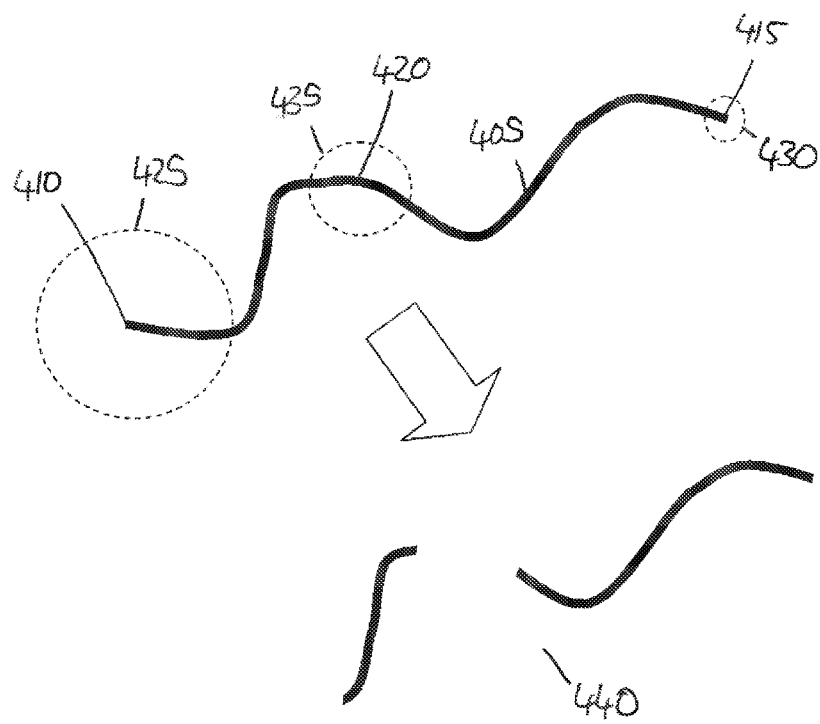
FIG. 15 is a schematic of a process for anonymizing a route trace.

Selecting the "no" button 332 causes the navigation device 200 to calculate a route between the current location and the selected destination and to display that route 334, as shown in FIG. 14, on a relatively low magnification map that shows the entire route. The user is also provided with a "done" virtual button 336 which the user can press to indicate the calculated route is acceptable, a "find alternative" button 338 that the user can press to cause the navigation device 200 to calculate another route to the selected destination, and a "details" button 340 that a user can press to reveal selectable options for the display of more detailed information concerning the currently displayed route 334.

In this instance, it is assumed that the user considers the displayed route acceptable, and once the "done" button 336 has been pressed the user is presented, with three-dimensional view (not shown) of the current, start, location for the navigation device 200.

The user then commences their journey and the navigation device 200 guides the user, in a known manner, by updating the map in accordance with determined changes in location of the navigation device 200, and by providing the user with visual and, optionally, audible navigation instructions.

Once the destination has been set by the user and the navigation device 200 has commenced navigating the user, the navigation device 200, via the processor 202 and the GPS receiver 224 constituting a location determination unit, monitors the location of the navigation device 200. Once the navigation device 200 has progressed a sufficient distance along the route planned by the application software 286 of the navigation device 200, it is necessary to update a three-dimensional view displayed by the display device 206. Using longitude and latitude data relating to the location of the navigation device 200, the map data processor 290 accesses the map data 293 and retrieves terrain data 294, land use data 296 and road data 298.

Throughout the journey, the location of the navigation device 200 as determined using the GPS receiver 224 is stored in the device memory 214 in order to construct a route trace 405 that comprises a plurality of location data points representative of locations of the navigation device 200 throughout at least part of a journey. At suitable times or intervals, such as when the navigation device 200 is connected to a personal computer or directly to the server 150 via the communications channel 152, the route traces 405 stored in the memory 214 of the navigation device 200 are uploaded to the server 150.

The server 150 is operable to collect and aggregate route traces 405 from a number of navigation devices 200. The route traces 405 may be analysed in order to determine vehicle locations, and parameters such as speed and time at various locations within each route trace 405. This aggregated route trace data may be analysed to provide information based on actual use, such as typical vehicle speeds at any point in the road network and at any time. The aggregated data may be used to determine variations to navigated routes and deviations from expected road map data, which may be indicative of changes to the road network and the like, such that validation of map and navigation data and algorithms may be obtained.

Before sending the route trace 405 to the server 150, the processor 202 is operable to analyse the route trace 405 in order to determine identity sensitive locations 410, 415, 420 within the route trace 405 that may potentially allow a user of the navigation device 200 to be identified. Examples of identity sensitive locations include a start location 410 of the route trace 405, a destination 415 and/or one or more intermediate or waypoint locations 420 specified or input by the user. In an optional embodiment, the identity sensitive locations may comprise the locations of user identifying apparatus such as CCTV cameras, or automatic licence plate scanning gates or cameras, such as those of, for example, congestion charge zones. Optionally, user data stored on, or accessible by, the navigation device 200 may be analysed to extract, for example, addresses stored in the user's address book or locations stored in the user's favourites list or recently visited list. The locations derived from the user data may be treated as identity sensitive locations.

It will be appreciated from the above, that the identity sensitive locations may be determined from the location data/ route trace using predetermined criteria and/or be stored on the memory 214 of the navigation device 200 or accessed from a memory 156 or data store 160 of the server 150 via the communications channel 152.

The navigation device 200 is operable to determine an identity sensitive portion 425, 430, 435 of the route trace 405 associated with each identity sensitive location 410, 415, 420.

The identity sensitive portion 425, 430, 435 for a given identity sensitive location 410, 415, 420 may be determined based on parameters associated with the identity sensitive location 410, 415, 420. The identity sensitive portions 425, 430, 435 comprise data representing locations of the route trace 405 that are within a determined threshold distance, time, or number of location data points from the associated identity sensitive location 410, 415, 420.

The size of the threshold and thereby the identity sensitive portion 425, 430, 435 is determined by assessing the parameters associated with the identity sensitive location 410, 415, 420 in relation to predetermined criteria stored on or accessible by the navigation device 200.

The navigation device 200 is configured to not store the identity sensitive portions 425, 430, 435 in its memory 200 or remove the identity sensitive portions 425, 430, 435 from the route trace, so as to form an anonymized route trace 440, before or after sending the anonymized route trace 440 to the server 150. In this way, it is more difficult for the user to be identified by cross referencing potentially identity sensitive locations 410, 415, 420 of the route trace 405, such as the start 410 and/or finish 415 and/or intermediate or via points 420, with other data sources, for example by cross referencing with publicly available data such as address lists, phone books, marketing lists, voters roll entries and the like, since a dynamically determined identity sensitive portion 425, 430, 435 of the route trace 405 surrounding, i.e. before and/or after the identity sensitive location 410, 415, 420, is not present in the anonymized route trace 440.

At the same time, the present inventors have realised that parameters associated with each identity sensitive location 410, 415, 420 may be indicative of the ease with which the route trace location data 405 may be cross referenced with other data to identify the originating user. By dynamically determining the identity sensitive portions 425, 430, 435 of the route trace 405 that are removed or not stored prior to communication of the route trace 405 to the server 150 based on such parameters associated with the identity sensitive location 410, 415, 420, it will be appreciated that the identity sensitive portions 425, 430, 435 can be enlarged for identity sensitive locations 410, 415, 420 where it is considered easier to identify the user by cross referencing in order to maximise privacy and shrinking or eliminating the identity sensitive portions 425, 430, 435 for identity sensitive locations where it is considered harder to identify the user by cross referencing in order to maximise the usable data that may be obtained.

Parameters associated with the identity sensitive locations 410, 415, 420 include map data, user data and previously stored location data. Examples of map data include road network density, feature density, feature attributes or properties, point of interest or location classification. Examples of user data includes address book data, favourite location data, recently visited location data, home or work address data and the like.

It will be appreciated that the parameters associated with the identity sensitive locations 410, 415, 420 may be stored in a memory 214 of the navigation device 200 or accessible via the communications channel 152, such as from the memory 156 or data store 160 of the server 150.

For example, areas having a high density of roads may be indicative of densely populated areas such as inner city areas, wherein there may be a high density of possible or potential user addresses. The navigation device 200 is configured to determine and quantify the road density associated with an identity sensitive location 410, 415, 420, for example by analysing map data, determining a road density at, or for a predefined area around, an identity sensitive location 410, 415, 420 and comparing the determined road density to reference values or road density thresholds stored in a look-up table. When the processor 202 of the navigation device 200 determines that the identity sensitive location 410, 415, 420 is associated with a high density of roads, the size of the identity sensitive portion 425, 430, 435 around the associated user identity location 410, 415, 420 may be decreased accordingly. Conversely, if an identity sensitive location 410, 415, 420 is determined to be in an area having a low road density, then this may be indicative of a sparsely populated rural area, in which traceability of a particular address or other location may be easier, and the associated identity sensitive portion 425, 430, 435 is increased accordingly to decrease traceability. In this way, for densely populated areas in which there may be large number of possible addresses, such that it would be hard to identify any particular user from the location, very little of the route trace 405 is lost. In contrast, in sparsely populated areas, wherein there may only be a few addresses in a large area, thereby making it easier to link an address or user to a location, the identity sensitive portion 425, 430, 435 associated with that identity sensitive location 410, 415, 420 is increased, thereby increasing the number of potential addresses comprised within the identity sensitive portion 425, 430, 435, making it harder to identify the identity sensitive location 410, 415, 420 within the identity sensitive portion 425, 430, 435 and thereby increasing the privacy of the user.

Similarly, density of a specified suitable feature (for example buildings of a certain type, or natural landmarks) or of a combination of specified suitable features, such as a number of high rise buildings at or within a predetermined area around each of the identity sensitive locations 410, 415, 420 is determined and classified from the map data and compared to values in a look up table. The size of the identity sensitive portion associated with the user identity location can be increased or decreased depending on the determined classification of feature density.

If the feature density is high, then the size of the identity sensitive portion 425, 430, 435 may be decreased, since a high feature density may be indicative of a high number of address options associated with that location, thus making it more difficult to identify a user associated with that location.

Conversely, the identity sensitive portion 425, 430, 435 may be increased if the feature density is determined to be low. A low feature density may be indicative of a rural area having fewer addresses, thus making identification of the user from that identity sensitive location 410, 415, 420 easier. By increasing the identity sensitive portion 425, 430, 435 that is removed from the route trace in such cases, the area around the identity sensitive location 410, 415, 420 that is removed from the route trace 405 is widened in order to increase the number of possible addresses contained therein, thus making it harder to identify the user related address.

It will be appreciated that more than one specified feature density or combinations of feature densities may be used. For example, if an identity sensitive location 410, 415, 520 is associated with a high road density but a low density of buildings, then this may be indicative of a rural area and the identity sensitive portion 425, 430, 435 is increased accordingly.

Data that characterises features associated with an identity sensitive location 410, 415, 420 may also be used to determine or adjust the associated identity sensitive portion 425, 430, 435 that is removed from the route trace. For example, if a building or buildings associated with an identity sensitive location 410, 415, 420 is characterised in the map data as being an office building or complex, then the associated identity sensitive portion 425, 430, 435 is decreased, as there may be a large number of people working there, thus making identification of an individual user from that location data more difficult. That may be case even if the office building or complex is located in an area with a low road density, for example a rural area. Similarly, if a major tourist attraction or civic amenity is associated with an identity sensitive location 410, 415, 420, then the identity sensitive portion 425, 430, 435 is decreased, as it is more difficult to link a well visited public location to any individual user. Similarly, point of interest (POI) or other characterisation information may be used, which may be extracted from map data or data input by the user (for example by selecting a car-park as a destination from a POI menu on the navigation device 200). In this case, the associated identity sensitive portion 425, 430, 435 is reduced as it would be difficult to link a public car park or road side parking place to any individual user.

Furthermore, the identity sensitive portion 425, 430, 435 may be tuned in dependence on an amount, type or quality of past trace data stored by the server 150 and/or navigation device 200. For example, the navigation device 200 may communicate with the server 150 to determine the amount and quality of stored route trace data 405 associated with a particular location. If a large amount, variety of route types or low quality trace data is available for a location, the size of an associated identity sensitive portion 425, 430, 435 can be decreased accordingly, as the measurement at the identity sensitive location 410, 415, 420 could get lost in the large amount of trace data 405. Similarly, in areas where trace data is of high quality or low in volume of past measurements, a new measurement 'stands out' and is easily detectable. In such areas, the identity sensitive portion 425, 430, 435 could be increased.

In an optional embodiment, the navigation device 200 is configured to determine the amount of location data that is stored for a particular location and to tune operation in dependence on the amount of location data. If a location is already well covered, then more data could be collected or stored, and if a location has a low coverage, then less location data may be collected or stored. This may allow for useful trace data collection on navigation devices 200 that are low on storage space as data is only stored where required to make up deficiencies in the coverage of the already stored data, and therefore, storage space is used more efficiently. The navigation device 200 may be in communication with the server 150 to determine which locations are sufficiently characterised with enough associated trace data 405 and which areas require further route trace data 405 to adequately characterise. The navigation device 200 is configured to only store and communicate trace data 405 when the coverage of location data for that location is determined to be deficient.

User data, such as electronic address books, home location, work location, favourites lists, recently visited locations and the like that is stored on or accessible by the navigation device 200 can be used to identify identity sensitive locations 410, 415, 420 and/or determine identity sensitive portions 425, 430, 435. The user data may, for example, be stored on and/or accessed from a personal information management (PIM) data system, such as a user's calendar. Any location or time data stored on or accessed from such a PIM data system would usually be treated sensitively. The navigation device 200 may be configured to increase the size of an identity sensitive portion 425, 430, 435 if an associated identity sensitive location 410, 415, 420 is determined to correspond to an address or location comprised in the user data. The user data may also be classified according to predetermined criteria and the size of the identity sensitive portion 425, 430, 435 may be varied depending on the classification of the user data. For example, the navigation device 200 may be configured to store a user's home location and this is considered most sensitive. Therefore, if a location in the trace data 405 is associated with the user's home location, the size of the identity sensitive portion 425, 430, 435 associated with this identity sensitive location 410, 415, 420 is increased to reflect this. Stored contacts or favourites can also be considered to be sensitive, but possibly less sensitive than the home location and the associated identity sensitive portions 425, 430, 435 are determined accordingly.

Figure 16:
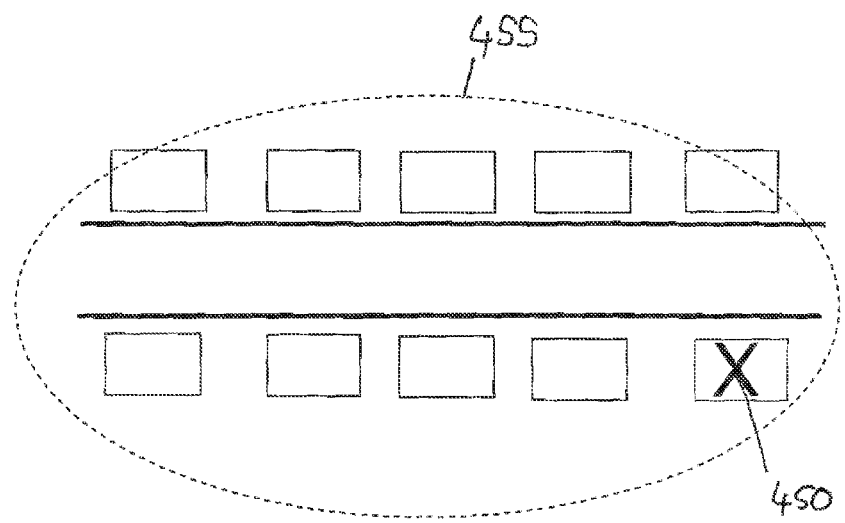
FIG. 16 is a schematic of an alternative process for anonymizing a route trace.

In an alternative or additional embodiment the quality of location data for identity sensitive locations 410, 415, 420 or within an identity sensitive portion 425, 430, 435 of the route trace 405 may be artificially modified, for example by providing less location data, less accurate location data and/or purposely false measurements such as false positions, positions offset in time or distance and the like. For example, as illustrated in FIG. 16, location data indicating an identity sensitive location 450 may indicate a house at the end of a street. In this case, the accuracy of the location data may be reduced so that it instead indicates a whole street 455, thereby reducing traceability of that identity sensitive location 410, 415, 420 while at the same time keeping the relevance of the data. Such modified data is marked or tagged such that it can be identified, for example, so that later processing can take this into account so as to prevent the modified data degrading the quality of information derived therefrom.

Figure 17:
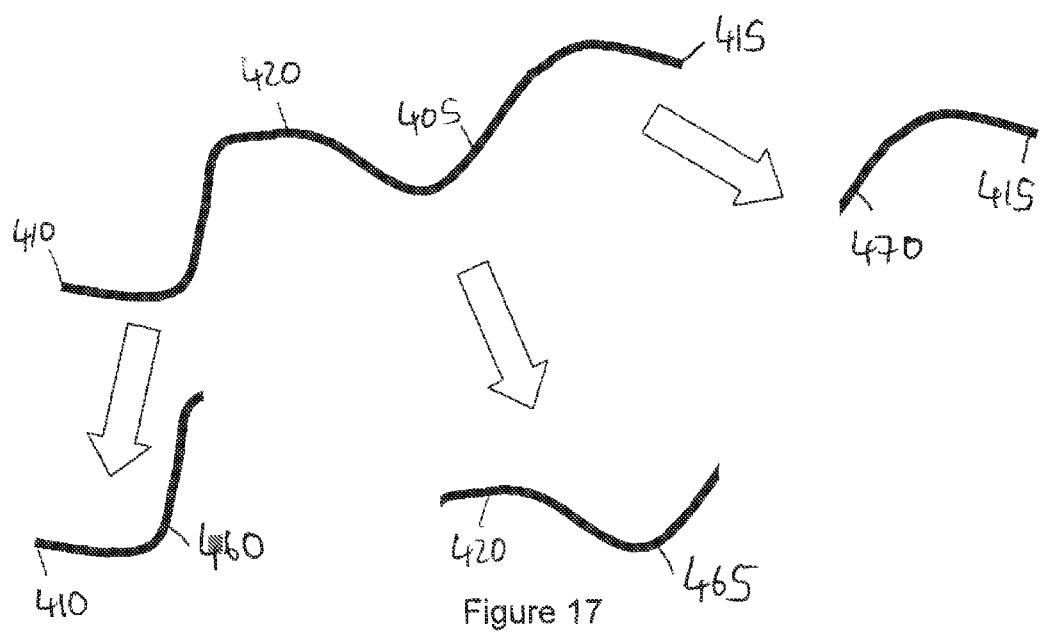
FIG. 17 is a schematic of a further process for anonymizing a route trace.

In a further alternative or additional embodiment, as illustrated in FIG. 17, a route trace 405 may be separated into two or more anonymized sub traces 460, 465, 470, for example, into a start trace 460 comprising the start of the route 410 and an end trace 4670 comprising the destination 415. In this way, the privacy of the user is further enhanced, as it is not possible for a user to determine if a sub trace 460, 465, 470 comprises a start of a route 410 or an end of a route 415 or indeed any other portion of a route. Preferably, each sub trace 460, 465,

470 may comprise at least one unique identity sensitive location 410, 420, 415 (and indeed, the sub trace may be considered equivalent to an expanded identity sensitive portion).

A further solution for anonymizing the data is to reject singular traces at the backend. In this way, route traces that represent a motorway or popular route may be accepted, whilst less popular routes such as country roads or private roads may be rejected.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Furthermore, whilst the above specific description describes the processing and conversion of a route trace 405 into an anonymized route trace 440 on a portable navigation device 200, it will be appreciated that such processing may be carried out on other portable devices that comprise or have access to location determination functionality, such as mapping devices. Furthermore, the processing and conversion may be carried out on an intermediate device, such as a personal computer, to which a navigation device is docked, connected or in communication before sending the data to the server 150, and/or may be carried out on the server 150 that receives location data from either the navigation or other device or from the intermediate device. Carrying out the processing and conversion on the navigation device 200 ensures privacy of the data from the earliest stage in the process, thereby increasing user privacy. Furthermore, as the anonymized data 440 may be a subset or superset of the determined route trace 405 and/or require less memory for storage than the determined route trace 405, performing this processing as the data is collected and/or before the data is stored in the memory 214 or 156 may increase memory utilisation on the navigation device 200 and in any event, performing of the processing and conversion may decrease the bandwidth required to send the route data and improve communications efficiency.

Furthermore several criteria and location related parameters have been described for determining the identity sensitive locations 410, 415, 420 and/or the extent of identity sensitive portions 425, 430, 435 of the route trace 405. However, it will be appreciated that the invention need not apply all of these criteria or parameters and/or may apply any combination of some or all of the described criteria or parameters or indeed may apply further parameters or combinations with or thereof that are not described herein but will be evident to a skilled person in view of the teachings provided herein.

Furthermore, whilst determination of an identity sensitive portion 425, 430, 435 has been described as being defined by a threshold distance, time and/or number of location data points it will be appreciated that other techniques for determining dimensions of the identity sensitive portion 425, 430, 435 may be used. Furthermore, it will be appreciated that the identity sensitive portion 425, 430, 435 need not be symmetric but instead may extend further in one direction (i.e. before or after) then another, wherein any asymmetry of the identity sensitive portion may be predefined, dependent on a parameter of the associated identity sensitive location 410, 415, 420 and/or be randomised or have a random component.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A mapping or navigation device, comprising:
position determining apparatus operable to determine one or more locations of the mapping or navigation device, the one or more determined locations forming at least one route; and
a processor configured to
determine at least one portion of the at least one route, the at least one portion being associated with one or more identity sensitive locations of the at least one route from which a user can be identified, and wherein at least one of a shape and a size of the at least one portion is determined according to map data associated with the one or more identity sensitive locations, and
form at least one anonymized route from the at least one determined route, wherein the at least one anonymized route does not include the at least one portion of the at least one route from which a user can be identified.

2. The mapping or navigation device according to claim 1, wherein the at least one portion of the at least one route comprises: a start of the at least one route; an end of the at least one route; and a location specified by a user of the mapping or navigation device.

3. The mapping or navigation device according to claim 1, wherein the at least one portion of the at least one route comprises locations that correspond to one or more of a home address, a work address, an address stored in a user address book, an address stored in a user favorites list, and an address of a recently visited location.

4. The mapping or navigation device according to claim 1, comprising communications apparatus for communicating the at least one anonymized route to a remote processing device.

5. The mapping or navigation device according to claim 1, wherein the map data comprises location density of a type or class of feature, and wherein the size of the at least one portion is dependent on the feature density.

6. The mapping or navigation device according to claim 5, wherein the size of the at least one portion is reduced in at least one of densely populated areas or if the identity sensitive location is associated with a certain point of interest tag.

7. The mapping or navigation device according to claim 1, wherein the map data comprises feature attributes or classifications, and wherein the size of the at least one portion is dependent on the feature attribute or classification.

8. The mapping or navigation device according to claim 1, wherein the map data comprises point of interest information, and wherein the size of the at least one portion is dependent on the point of interest information.

9. The mapping or navigation device according to claim 1, wherein the map data comprises use data associated with an identity sensitive location, and wherein the size of the at least one portion is dependent on the use data.

10. A processing device, comprising:
a processor; and
a communications apparatus coupled to processor, the communications apparatus being configured to receive location data, the location data comprising one or more locations of a mapping or navigation device, the one or more locations forming at least one route,
where the processor is configured to
determine at least one portion of the at least one route, the at least one portion being associated with one or more identity sensitive locations of the at least one route from which a user can be identified, and wherein at least one of a shape and a size of the at least one portion is determined according to map data associated with the one or more identity sensitive locations, and
form at least one anonymized route from the at least one determined route, wherein the at least one anonymized route does not include the at least one portion of the at least one route from which a user can be identified.

11. The processing device according to claim 10, wherein the at least one portion of the at least one route comprises: a start of the at least one route; an end of the at least one route; and a location specified by a user of the mapping or navigation device.

12. The processing device according to claim 10, wherein the at least one portion of the at least one route comprises locations that correspond to one or more of a home address, a work address, an address stored in a user address book, an address stored in a user favorites list, and an address of a recently visited location.

13. The processing device according to claim 10, wherein the map data comprises location density of a type or class of feature, and wherein the size of the at least one portion is dependent on the feature density.

14. The processing device according to claim 10, wherein the map data comprises feature attributes or classifications, and wherein the size of the at least one portion is dependent on the feature attribute or classification.

15. The processing device according to claim 10, wherein the map data comprises point of interest information, and wherein the size of the at least one portion is dependent on the point of interest information.

16. The processing device according to claim 10, wherein the map data comprises use data associated with an identity sensitive location, and wherein the size of the at least one portion is dependent on the use data.

17. The processing device according to claim 10, wherein the size of the at least one portion is reduced in at least one of densely populated areas or if the identity sensitive location is associated with a certain point of interest tag.

18. A method of processing a route, comprising:
receiving or determining one or more locations, the one or more locations forming at least one route;
determining at least one portion of the at least one route, the at least one portion being associated with one or more identity sensitive locations of the at least one route from which a user can be identified, and wherein at least one of a shape and a size of the at least one portion is determined according to map data associated with the one or more identity sensitive locations; and
forming at least one anonymized route from the at least one determined route, wherein the at least one anonymized route does not include the at least one portion of the at least one route from which a user can be identified.

19. A non-transitory computer program element comprising computer program code which, when executed on a computer, causes the computer to perform the processing of a route comprising:
receiving or determining one or more locations, the one or more locations forming at least one route;
determining at least one portion of the at least one route, the at least one portion being associated with one or more identity sensitive locations of the at least one route from which a user can be identified, and wherein at least one of a shape and a size of the at least one portion is determined according to map data associated with the one or more identity sensitive locations; and
forming at least one anonymized route from the at least one determined route, wherein the at least one anonymized route does not include the at least one portion of the at least one route from which a user be identified.

* * * * *